M. Pratt,
Smoothing Key-Boards.
N° 56,862. Patented July 31, 1866.
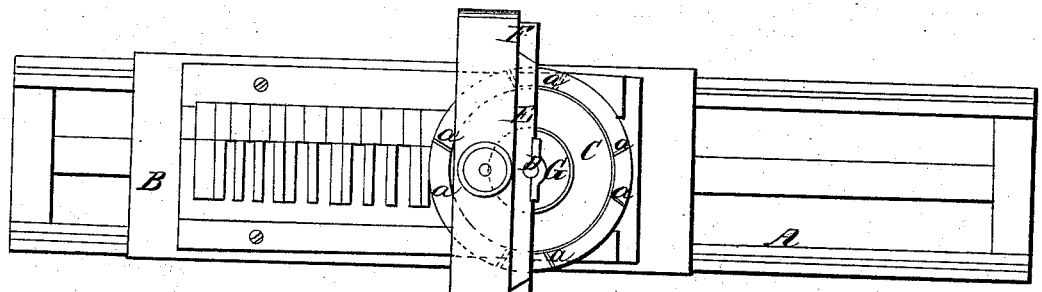
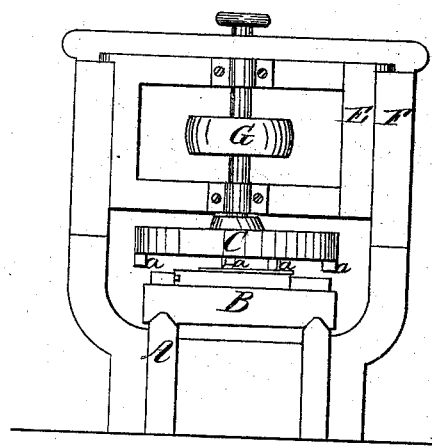

United States Patent Office.

MILON PRATT, OF MERIDEN, CONNECTICUT, ASSIGNOR TO HIMSELF AND CLEMENS DARNSTAEDT, OF SAME PLACE.

MACHINE FOR SMOOTHING IVORY KEY-BOARDS.

Specification forming part of Letters Patent No. 56,862, dated July 31, 1866.

*To all whom it may concern:*

Be it known that I, MILON PRATT, of Meriden, in the county of New Haven and State of Connecticut, have invented a new and Improved Machine for Smoothing Off the Ivory Surface of Key-Boards; and I do hereby declare that the following is a full, clear, and exact description thereof, which will enable those skilled in the art to make and use the same, reference being had to the accompanying drawings, forming part of this specification, in which—

Figure 1 represents a plan or top view of this invention. Fig. 2 is an end elevation of the same.

Similar letters of reference indicate like parts.

The subject of this invention is a machine particularly intended to scrape off the ivory surface of key-boards for melodeons, pianofortes, and other musical instruments. Said key-boards are usually prepared by cutting out the pieces of ivory requisite for covering the keys, fastening the same down upon a level surface, and planing or scraping them off by hand—an operation which requires much time and great skill and attention.

Instead of performing the operation by hand-labor, according to this present invention a machine is used which is composed mainly of a bed sliding back and forth on suitable ways under a cutter-head which is mounted on a vertical spindle, and in which the cutters are secured. Said cutters are arranged in pairs placed so that their cutting-edges are in tangential positions, diverging from each other toward the circumference of the cutter-wheel in such a manner that said cutters are not liable to jar while passing over the keys, and a smooth and level surface is produced.

A represents a frame of wood or any other suitable material, made in such a manner that the same forms guideways for the bed B. This bed is intended to support the key-boards which are to be smoothed off, and it may be arranged with suitable mechanism to impart to it a reciprocating motion similar to that of an ordinary planing-machine. Said bed is situated under the cutter-wheel C, which is mounted on the vertical arbor D, that has its bearings in a gate, E. This gate moves up and down in suitable guideways between uprights F, which rise from the frame A, and it may be provided with suitable mechanism, by means of which it can be raised or lowered and adjusted in the desired position. A pulley, G, serves to impart to the arbor D and cutter-wheel C the requisite rotary motion. Said cutter-wheel is furnished with a series of cutters, $a$, which are arranged in pairs, as shown in Fig. 1. By referring to said figure it will be seen that they are not placed in radial positions, but they are situated in positions tangential toward a circle described from the center of the cutter-wheel with a diameter about equal to one-half (more or less) the diameter of the cutter-wheel itself. If the cutters are placed in radial positions, each cutter follows precisely in the track of the other, and the wheel is liable to jar, producing a bad result; but by placing the cutters in tangential positions in opposite directions, all jar is avoided and the key-boards are rendered perfectly smooth.

By the use of this machine I am enabled to perform the operation of smoothing off the ivory surface of key-boards much quicker than by hand; and, furthermore, the corners or edges of the keys are not liable to become chamfered or rounded off, which is the case when the operation is performed by hand.

I claim as new and desire to secure by Letters Patent—

The combination of the reciprocating bed B, adapted for the securing upon it of the ivory key-pieces, the rotary head C, provided with cutters $a$ $a$, arranged obliquely in pairs, and the guideways A, all constructed, arranged, and employed as specified, for smoothing off the ivory surface of key-boards.

MILON PRATT.

Witnesses:
SAML. B. MORGAN,
W. A. REED.